United States Patent [19]

Cole et al.

[11] 4,010,019

[45] Mar. 1, 1977

[54] METHOD OF MAKING MICROCHANNEL PLATES

[75] Inventors: Henry B. Cole, East Woodstock, Conn.; Colin K. Yates, Dudley, Mass.

[73] Assignee: American Optical Corporation, Southbridge, Mass.

[22] Filed: Nov. 19, 1971

[21] Appl. No.: 203,099

[52] U.S. Cl. .................................. 65/36; 65/4 B; 65/DIG. 7

[51] Int. Cl.² ........................................ C03B 23/20

[58] Field of Search ............ 65/4, 36, 41, 108, 109, 65/110

[56] References Cited

UNITED STATES PATENTS

| | | | |
|---|---|---|---|
| 3,204,326 | 9/1965 | Granitsas | 65/4 UX |
| 3,350,183 | 10/1967 | Siegmund et al. | 65/4 |
| 3,622,291 | 11/1971 | Fleck et al. | 65/108 |
| 3,652,248 | 3/1972 | Loxley et al. | 65/108 |

*Primary Examiner*—Richard D. Lovering
*Attorney, Agent, or Firm*—William C. Nealon

[57] ABSTRACT

Making glass microchannel plates by drawing bundles of large numbers of glass tubes sufficiently to reduce the cross-sectional sizes of openings through the tubes to desired microchannel size with minimal distortion of original tube shape and wall thickness in resulting assemblies. Drawing is accomplished with no less than two separate steps; a first step being effected with large pulling force and minimal heating and a second step effected with relatively small pulling force, heating to relatively high viscosity and rapid drawing for short exposure to heat.

3 Claims, 4 Drawing Figures

1

METHOD OF MAKING MICROCHANNEL PLATES

BACKGROUND OF THE INVENTION

1. Field of the Invention

Microchannel plates with particular reference to improvements in method of manufacturing same.

2. Description of the Prior Art

Prior art methods of manufacturing microchannel plates involve the steps of assembling a great number of glass tubes in side-by-side relationship with each other and drawing the bundle in a single step to a finished cross-sectional size.

A glass tube heated sufficiently to change size due to drawing forces is also soft enough to be effected by surface tension forces acting on the tube. These forces cause thickening of the wall sizes of tubes as their outside diametral size is decreased, thus decreasing or shrinking the relative size of tube opening in each case. Additionally, in the usual array of tubes used for making microchannel devices, a differential shrinkage, (reduction of inner diametral size of tubes relative to their respective other diametral sizes) has the tendency to distort the outer shape of the whole array and produce non-uniform pore or channel size of openings in the resulting structure.

This invention provides for the drawing of bundles of glass tubes to desired reduced microchannel size with negligible effect of surface tension forces and greater control of size and shape of microchannels.

SUMMARY OF THE INVENTION

The foregoing and corollary objectives of the present invention are accomplished through utilization of a multiple step drawing operation designed to overcome the usual adverse effect of surface tension forces resulting from prior art single step drawing techniques. Carefully controlled heating and applied drawing forces are designed to minimize surface tension effects in each step of drawing the multitube assembly whereby total surface tension forces tending to distort or alter shapes of microchannel end products are rendered substantially negligible.

The drawing of relatively large size bundles of glass tubes to reduce cross-sectional size is accomplished according to this invention with no less than two separate steps. A first drawing step utilizes large pulling force with minimal heating thereby keeping the glass at high viscosity (relatively non-flowable) for minimal effect of surface tension forces. The operation is completed with final drawing of the bundle in one or more additional steps each with a relatively small pulling force, heating to relatively high viscosity and rapid drawing for short exposure to heat thus also avoiding adverse effects of surface tension forces.

Details of this invention will become more readily apparent from the following description when taken in conjunction with the accompanying drawing.

DESCRIPTION OF THE PREFERRED EMBODIMENTS

This invention relates to the making of multichannel structures by heating and drawing bundles of relatively large glass tubes to considerably reduced cross-sectional size thereby causing inner diameters of the tubes to become reduced to desired very small channel size, e.g. from 0.020 to 0.035 inch in diameter.

In such operations, glass tubes heated sufficiently to change size when drawn, become soft enough to be affected by surface tension forces acting thereon. However, it has been discovered that the adverse effect of surface tension forces, e.g. causing wall thicknesses of tubes to increase as tube size decreases, can be minimized either by drawing the glass tubes at high viscosity (low temperature) or reducing the time of heating of the glass during drawing (e.g. by rapid drawing).

Figure 1:
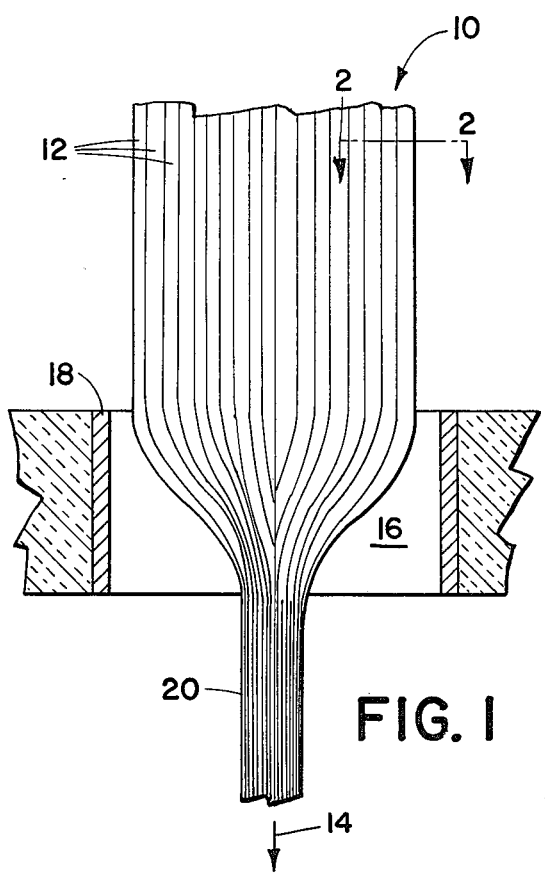
FIG. 1 is a diagrammatic illustration of a first step of the method of drawing microchannel devices according to the present invention.
Figure 3:
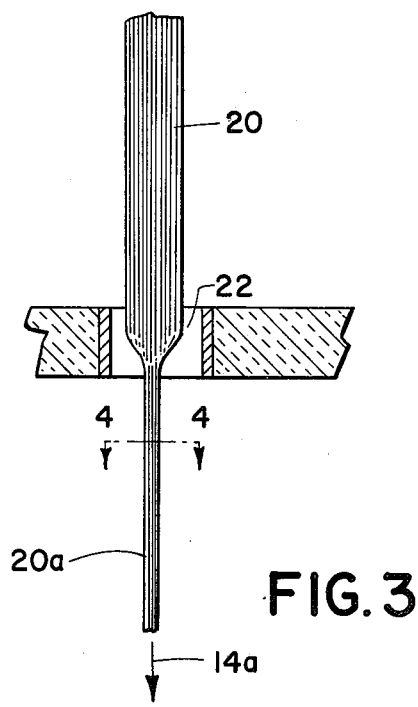
FIG. 3 is a diagrammatic illustration of the performance of a second step of the process of this invention.

The present invention accomplishes its objectives as follows:

Total reduction of size of openings through bundle 10 of glass tubes 12 (FIG. 1) to microchannel size is accomplished with multiple drawing operations. This use of two or more drawing operations for reducing the bundle 10 to desired cross-sectional size uniquely renders the total effects of surface tension forces acting on tubes 12 negligible.

Bundle 10 (FIG. 1) is, in a first drawing operation, only partially reduced in size for the purpose of making possible a use of large drawing force 14 so that heating in drawing zone 16 with heating element 18 may be minimized. Exemplary reduction in sizes are from 1.25 inches in diameter to approximately 0.250 inch at a rate of approximately 3 inches per hour for bundle 10 with heating to approximately 1055° F in zone 16 when tubes 12 are formed of a lead-flint glass containing from approximately 50 to 60% lead. Thus, in the first step of drawing (FIG. 1) advantage is taken of the ability to maintain tubes 12 at relatively low temperature and high viscosity by utilizing a large pulling force 14 whereby surface tension forces have negligible effect upon inner diametral size of tubes, i.e. relative thicknesses of tube walls do not substantially increase as bundle 10 is drawn.

In further drawing section 20 of bundle 10 to a finally reduced cross-sectional size of, for example 0.025 inch, section 20 is heated in a drawing zone 22 to a suitable higher temperature than that used in zone 16 for less resistance to drawing and making possible more rapid drawing in zone 22 for the accomplishment of less than usual or minimal time of exposure to the applied heat. Thus, the adverse effects of surface tension forces are again essentially overcome, this time by minimizing duration of heating in zone 22. The temperature in zone 22 may be approximately 1100° F, for example, with drawing taking place at a rate of approximately 30 inches per hour. Arrow 14a indicates the direction of drawing.

From the foregoing it can be seen that, in distinguishing over prior art practices of drawing large bundles of tubes such as bundle 10 directly to a final reduced cross-sectional size with problems of distortion due to surface tension forces, the present multiple step drawing operation obviates problems concerning surface tension forces with improved end product results.

Figure 2:
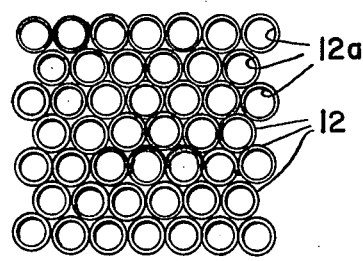
FIG. 2 is a fragmentary cross-sectional view taken on line 2—2 of FIG. 1.
Figure 4:
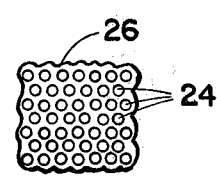
FIG. 4 is a greatly enlarged cross-sectional view taken on line 4—4 of FIG. 3.

FIG. 2 illustrates a fragmentary cross-sectional view of the initial bundle of tubes 12 and FIG. 4 is illustrative of a cross-section of a typically finally drawn microchannel structure. Openings 24 (FIG. 4) may be in the order of 12 microns in diameter with the matrix material 26 extending therearound being relatively proportionately substantially no greater in volume or thickness than that of walls 12a of tubes 12 in bundle 10 of FIG. 1.

It is to be understood that while only two steps of drawing have been shown and described herein for purposes of illustration only, three or more graduated steps of drawing may be used according to the present inventive concept of avoiding the aforementioned adverse effects of surface tension forces.

We claim:

1. The method of making microchannel plates of a multiplicity of relatively large tubes of glass each having a preselected ratio of wall thickness to inner diametral size, said tubes being arranged in parallel side-by-side relationship with each other as a bundle and drawn longitudinally sufficiently to render openings through said tubes of desired microchannel size wherein the improvement comprises maintaning said ratio of wall thickness to inner diametral size of said tubes substantially constant throughout said method by the practice of no less than two drawing operations including the steps of:

heating said bundle in a zone adjacent one end thereof to a temperature such that the glasses of said tubes are substantially non-flowable and minimally softened for drawing with large pulling force;

drawing said heated bundle of glass tubes with said large pulling force slowly into a first section of reduced cross-sectional size having openings therethrough approaching but larger than said desired microchannel size with said ratio of wall thickness to inner diametral size of said tubes substantially unaltered;

heating a length of said first section of said bundle in a zone adjacent one of its ends to a higher drawing temperature such that the glasses of said tubes are sufficiently softened for drawing into a second section of further reduced cross-sectional size with a substantially smaller pulling force than said first mentioned pulling force to prevent breakage of said second section; and redrawing said heated first section with said smaller pulling force sufficiently to reduce the size of said openings through said tubes to said desired microchannel size, said redrawing being effected relatively rapidly to maintain said ratio of wall thickness to the inner diametral size of said tubes substantially unaltered by minimizing the time of exposure of said tubes to said latter drawing temperature.

2. The method according to claim 1 wherein the extent of said heating of said bundle of relatively large tubes for drawing with large pulling force is such as to maintain said glasses of said tubes highly viscous whereby effects of surface tension forces tending to alter said ratio of wall thickness to inner diametral size of said tubes during said step of drawing with large pulling force are substantially obviated; and said heating of said length of said drawn first section of said bundle to higher temperature and said relatively rapid redrawing thereof minimizes duration of exposure of said redrawn section to said higher drawing temperature whereby surface tension forces acting upon said redrawn section of said bundle and tending to alter said ratio of wall thickness to inner diametral size of said tubes are also substantially obviated.

3. The method according to claim 1 wherein said bundle of tubes of glass is drawn to a reduced cross-sectional size of approximately 1/5 of its original cross-sectional size during said first step of drawing of said heated bundle into said first section; and said first section of said bundle is redrawn to approximately 1/10 its cross-sectional size during said step of redrawing.

* * * * *